United States Patent [19]

Singh et al.

[11] Patent Number: 5,766,698

[45] Date of Patent: Jun. 16, 1998

[54] METHOD FOR MODIFYING SURFACES WITH ULTRA THIN FILMS

[75] Inventors: Brij P. Singh; Pramod K. Arora, both of North Royalton, Ohio

[73] Assignee: NanoFilm Corporation, Valley View, Ohio

[21] Appl. No.: 755,964

[22] Filed: Nov. 25, 1996

[51] Int. Cl.$^6$ .................................. B05D 7/02; B05D 7/14
[52] U.S. Cl. .................... 427/601; 427/353; 427/387; 427/388.1; 427/393.5; 428/447
[58] Field of Search .................................. 427/387, 352, 427/353, 354, 388.1, 601, 393.5; 428/447

[56] References Cited

U.S. PATENT DOCUMENTS

| | | | |
|---|---|---|---|
| 4,539,061 | 9/1985 | Sagiv | 156/278 |
| 4,851,043 | 7/1989 | Dotson et al. | 106/14.11 |
| 5,078,791 | 1/1992 | Singh et al. | 106/287.14 |
| 5,106,561 | 4/1992 | Singh et al. | 264/165 |
| 5,166,000 | 11/1992 | Singh et al. | 428/428 |
| 5,173,365 | 12/1992 | Singh et al. | 428/333 |
| 5,204,126 | 4/1993 | Singh et al. | 425/412 |
| 5,219,654 | 6/1993 | Singh et al. | 428/336 |
| 5,300,561 | 4/1994 | Singh et al. | 524/765 |
| 5,435,839 | 7/1995 | Ogawa | 106/10 |
| 5,545,255 | 8/1996 | Ogawa | 106/272 |

OTHER PUBLICATIONS

Hawley's Condensed Chemical Dictionary, Twelfth Edition, 1993, Defn. of "Ultrasonics".

Bigelow, W.C. et al., Oleophobic Monolayers. I. Films adsorbed from solution in non–polar liquids. J. Colloid Science 1: 513–538 (1946), No Month Given.

Lieng–Huang Lee. Wettability and Conformation of Reactive Polysiloxanes. J. Colloid and Interface Science 27(4): 751–760 (Aug. 1968).

Polymeropoulos, E.E. and Sagiv, J., Electrical Conduction Through Adsorbed Monolayers. J. Chem. Phys. 69(5): 1836–1847 (Sep. 1978).

*Primary Examiner*—Erma Cameron
*Attorney, Agent, or Firm*—Jones, Day, Reavis & Pogue

[57] ABSTRACT

A faster and more efficient method for applying ultra thin films to substrate surfaces is disclosed. The method comprises heating a film forming composition comprising amphiphilic molecules to a liquid state, immersing the substrate surface in the heated liquid composition to heat the surface, and washing away the excess composition. For surfaces that ordinarily have insufficient or no chemical moieties reactive with the amphiphilic molecules, the immersion in the heated composition causes the substrate to become porous and expose previously unavailable chemically reactive moieties in the surface matrix. The amphiphilic molecules then self-assemble, chemically bond to the surface matrix and self-polymerize with each other and with other surface matrix-bound and/or surface-bound molecules to form the ultra thin surface film. The method is also faster and more efficient for coating non porous and metal surfaces.

9 Claims, 1 Drawing Sheet

METHOD FOR MODIFYING SURFACES WITH ULTRA THIN FILMS

BACKGROUND OF THE INVENTION

This invention relates to the art of coating compositions and to a method for providing surfaces with coatings. This invention is particularly applicable to ultra thin films formed by amphiphilic molecules and will be described with specific reference thereto. However, it will be appreciated that certain features of the invention have broader aspects, and may be used with other types of film forming substances and coating compositions.

The forming of ultra thin, self-assembling molecular films from compositions containing amphiphilic molecules, and methods for modifying substrate surfaces with these films, are described in our commonly assigned U.S. Pat. Nos. 5,078,791; 5,106,561; 5,166,000; 5,300,561; 5,173,365; 5,204,126; and 5,219,654, the disclosures of which are hereby incorporated by reference. These ultra thin films are advantageous for coating non-porous surfaces of glass, plastics, ceramics, porcelain, fiberglass and metals, to provide scratch resistance, corrosion protection, anti-reflective optics, friction reduction, print priming, moisture barriers, and the like. For example, the films may be used for coating laboratory glassware and for providing a non-stick coating for pots, pans, dishes or utensils. The films are particularly advantageous for use on plastic eyewear lenses, such as those manufactured of aliphatic and polycarbonate resins that are pre-treated with a hard coat for scratch resistance.

As particularly disclosed in U.S. Pat. Nos. 5,078,791 and 5,219,654, substrate surfaces can be treated with a composition comprising amphiphilic molecules dispersed in a nonaqueous carrier, such as petrolatum, mineral jelly, hydrogenated animal or vegetable oil, or the like. The carrier has a gel state at a temperature of about 20° C. that is sufficient to inhibit diffusion of moisture and/or oxygen into the composition and to maintain a uniform dispersion of the amphiphilic molecules throughout the carrier. The composition, in the gel state, is typically applied to the substrate surface at room temperature by wiping, brushing, rolling, spraying, or the use of a doctor blade. Upon application to the substrate surface, the amphiphilic molecules automatically separate from the composition by chemically attractive forces between the molecules and the substrate surface, and spontaneously self-assemble in-situ and chemically bond to the substrate surface to form a substantially continuous thin film of substantially uniform thickness not greater than about 0.5 microns. After a treatment time period, typically 15 minutes to one hour, the excess coating composition is washed away. The film forming substances may be self-polymerizing in-situ or may contain polymerizable moieties that are cross-linkable by heating, photochemical reaction and/or the use of a catalyst.

The above approach has been shown to be effective for applying an ultra thin film coating to substrates having non-porous, i.e. glass or glass-like, surfaces that are chemically reactive with the film forming substance. In the context of this invention, a chemically reactive surface is a surface that has a sufficient number of chemical moieties available to bond with the amphiphilic molecules, such that the amphiphilic molecules self-assemble on the surface, chemically bond to the chemical moieties, and are in close enough proximity to self-polymerize to form a substantially continuous thin surface film. For example, plastic eyewear lenses made of CR-39 (PPG Industries) have chemically reactive surfaces that can be successfully coated with the ultra thin films. Lenses that are pre-treated with a chemical "hard coat" (e.g. polysiloxanes or acrylics) for scratch resistance also can be coated with the continuous thin film if the hard coat is chemically reactive with the film forming substance. However, the application of these ultra thin films is currently limited to chemically reactive surfaces.

Surfaces that have inadequate chemical reactivity (i.e. surfaces having an insufficient number of available chemically reactive groups for bonding with the amphiphilic molecules, such that the bound molecules are not in close enough proximity to self-polymerize and form a continuous film) are not coatable by the processes described above. In addition, surfaces that ordinarily would be chemically reactive but that are pre-treated with hard coats that are chemically unreactive or have inadequate chemical reactivity, are also not presently coatable. In the context of the invention, chemically unreactive surfaces are those with substantially no available chemical moieties capable of chemically bonding amphiphilic molecules.

Moreover, current methods employing a gel composition may not readily allow efficient surface coating of relatively inaccessible areas in odd-shaped articles. The current processes are also time-consuming due to the slow mobility of the amphiphilic molecules in the gel consistency of the carrier. The processes are also not sufficiently economical for use in large scale commercial treatment applications.

SUMMARY OF THE INVENTION

The present invention solves the aforementioned problems by providing a fast and efficient method of ultra thin film coating of surfaces that have inadequate chemical reactivity with the film forming substance, such as certain substrates manufactured of urethane, acrylics, high index plastics, and surfaces that are potentially chemically reactive but are pre-treated with chemically unreactive or inadequately reactive compounds. The term "high index" refers to plastics having a high index of refraction of approximately 1.6–1.66 and commonly used for safety eyewear. High index and other plastics are often also pre-treated with hard coats and/or anti-reflective metal oxide films.

The method is also faster, more practical and more efficient for treating non-porous and other surfaces that are chemically reactive, including CR-39, glass, ceramic, porcelain, fiberglass and metals. The invention also provides a faster and more efficient method for effectively coating surfaces of odd-shaped articles that were relatively inaccessible by previous methods. The method is also suitable for treating surfaces on a large scale commercial basis.

According to the invention, the film forming substance, comprising the polymerizable amphiphilic molecules, is dispersed in a carrier that has a gel state below 25° C. and a melting point in a range of 30° C. to 90° C. The composition is heated to a temperature in the range of 30° C. to 120° C. at which temperature the composition is completely melted and is a liquid. The substrate surface is immersed in the heated liquid composition for a period of time sufficient to heat the substrate surface to a temperature at which it becomes porous and exposes chemically reactive groups within the surface matrix that were previously unavailable for reacting with the film forming substance. The immersion time period is sufficient to allow the polymerizable amphiphilic molecules to automatically separate from the heated liquid composition and to self-assemble and chemically bond to the newly exposed chemically reactive groups within the surface matrix, and to self-polymerize within the surface matrix and with other surface-bound and/or surface matrix-bound amphiphilic molecules to form bridges between the respective polymerized molecules sufficient to form a substantially continuous thin film on the surface of the substrate, the surface film having a substantially uniform thickness not greater than about 0.5 microns. After the treatment period, the excess composition is washed away, typically with soap and warm water, preferably in a sonicator. The substrate is then cooled to room temperature or a temperature sufficient to secure the polymerized amphiphilic molecules in-situ. The amphiphilic molecules may also contain other polymerizable moieties which are cross-linkable by heating, photochemical reaction and/or the use of a catalyst to strengthen the bonds.

DETAILED DESCRIPTION OF THE INVENTION

Figure 1:
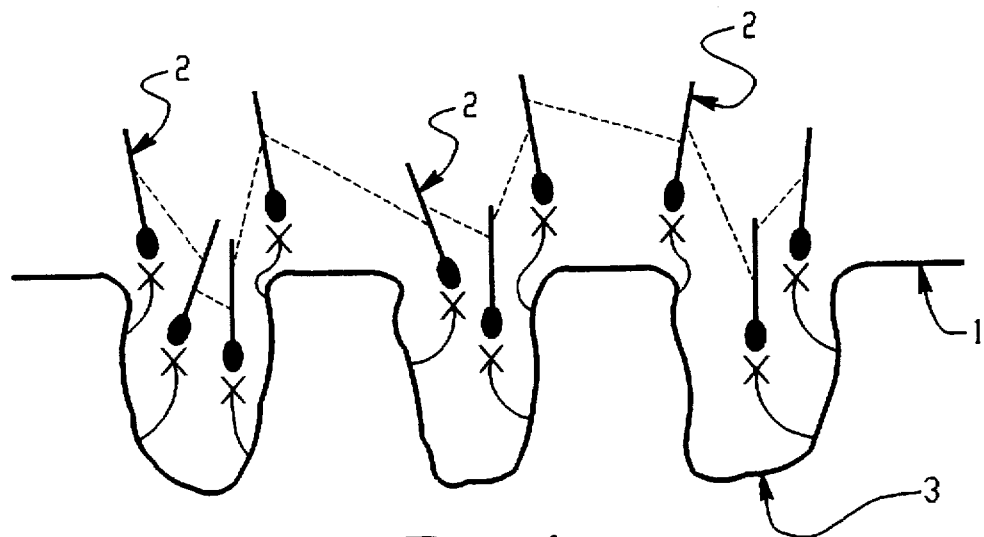
FIG. 1 is a schematic illustration of a substrate surface that has become porous upon immersion in the heated liquid film forming composition. Polymerizable amphiphilic molecules are chemically bonded to exposed reactive chemical moieties within the surface matrix and self-polymerized with each other and other surface matrix-bound molecules.

As used in the context of this invention, a film forming substance is one containing amphiphilic molecules that are capable of self-assembly, self-polymerization and chemical bonding to chemical groups within the surface matrix and/or on the surface of a substrate and of forming a substantially continuous ultra thin film of substantially uniform thickness on a substrate surface. A substantially continuous film is one that is substantially unbroken except for the presence of relatively minor defects or imperfections, such as pin holes. An amphiphile contains a polar region and a non-polar or apolar region.

Methods for applying ultra thin films to non-porous substrates that have surfaces that are chemically reactive with amphiphilic molecules are described in the U.S. patents incorporated by reference above. The molecules attach themselves to the substrate surface by various reactions and forces and are primarily chemically bound to the surface. The molecules self-assemble and self-polymerize on the surface to form the ultra thin film.

The method according to the present invention, however, allows application of ultra thin films to substrates that have an inadequate number of or have no available surface groups that are chemically reactive with the amphiphilic molecules, but that do have chemically-reactive groups available within the surface matrix. When these substrates are heated by immersion in the heated liquid film forming composition to a temperature in the range of 30° C. to 120° C., the surfaces become porous and expose chemically reactive moieties within the surface matrix that were previously unavailable and that are now available for chemically bonding with the film forming substance.

By the method of the invention, the amphiphilic molecules comprising the film forming substance are substantially homogeneously dispersed in a non-aqueous carrier that has a gel state at a temperature below 25° C. and a liquid state at a temperature of 30° C. to 120° C. The carrier has a consistency in the gel state and the liquid state that is sufficient to inhibit diffusion of moisture or oxygen into the composition and to hold the molecules in suspension so that agglomeration of the molecules is minimized. This stabilizes the film forming substance, minimizes its deterioration and prevents its precipitation out of solution. By the method of the invention, the composition is heated to a temperature of 30° C. to 120° C. at which temperature it is completely melted and is in a liquid state. The substrate is then completely immersed in the heated liquid composition for a period of time sufficient to heat the substrate surface to a temperature at which it becomes porous and exposes the chemically reactive moieties within the surface matrix. The time period is also sufficient to allow the amphiphilic molecules to automatically separate from the heated liquid composition, to impregnate the surface matrix, to chemically bond to the reactive moieties within the surface matrix and to self-assemble and self-polymerize within the surface matrix. Self-polymerization of the amphiphilic molecules is enhanced by the heat applied by the method of the invention and the moisture normally found within the pores of the substrate matrix. Because the pores of the surface matrix are closely spaced, the surface matrix-bound molecules self-polymerize with other surface matrix-bound and/or surface amphiphilic molecules and bridge the surface area between the pores, allowing the formation of a substantially continuous thin film on the substrate surface of substantially uniform thickness not greater than about 0.5 microns.

Figure 2:
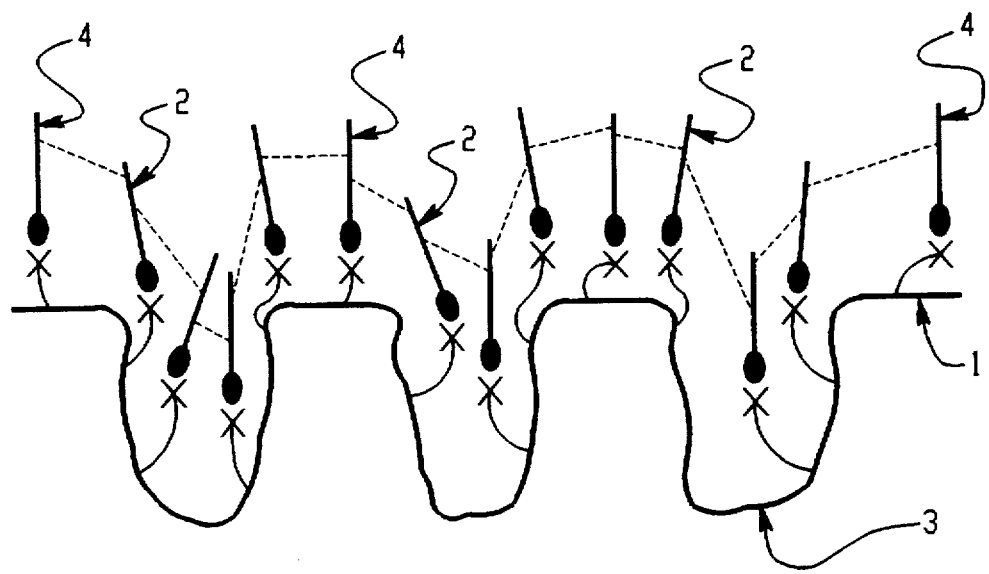
FIG. 2 is a schematic illustration of a substrate surface that has become porous upon immersion in the heated liquid film forming composition. Polymerizable amphiphilic molecules are chemically bonded to exposed reactive chemical moieties within the surface matrix and self-polymerized with each other and with other surface-bound molecules.
Figure 3:
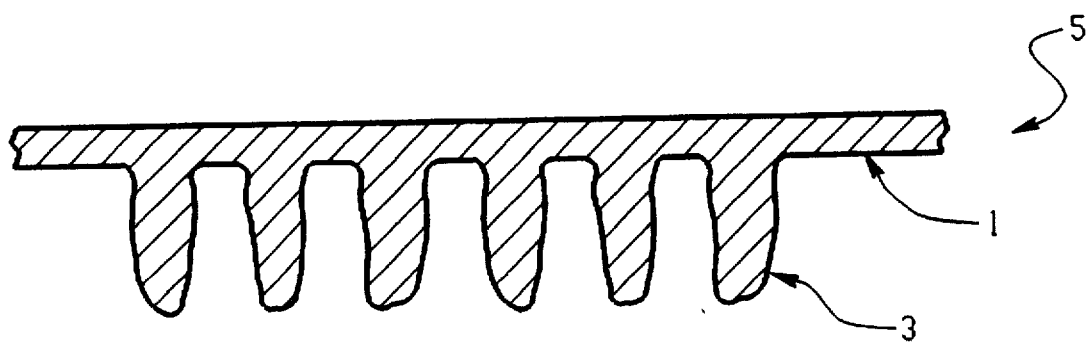
FIG. 3 is a schematic illustration of the porous substrate surface of FIGS. 1 and 2 coated with a substantially continuous thin surface film of substantially uniform thickness not greater than about 0.5 microns.

As illustrated in FIGS. 1 to 3, a porous substrate surface 1 coated by the method of the invention comprises polymerizable amphiphilic molecules 2 self-assembled and chemically bonded to exposed chemically reactive surface matrix moieties X and self-polymerized within the surface matrix 3. The surface matrix-bound molecules 2 may self-polymerize to other surface matrix-bound molecules (dotted lines) as illustrated in FIG. 1, or may self-polymerize to surface-bound molecules 4, as illustrated in FIG. 2, to form the continuous surface film 5, as illustrated in FIG. 3.

The period of time in which the substrate is immersed in the heated liquid composition is preferably 5 seconds to 20 minutes, more preferably 10 seconds to 10 minutes, and most preferably 30 seconds to 5 minutes. Following the treatment period, the substrate surface is removed from the heated liquid composition and the excess of the composition is washed away with a heated liquid, such as by washing with soap and warm water, and then rinsed. Preferably, the washing and rinsing is accomplished in a sonicator. The temperature of the water or other heated liquid is preferably 30° C. to 80° C., and more preferably 40° C. to 70° C. The moisture and heat enhance the self-polymerization of the molecules. A suitable solvent, such as mineral oil, may also be used to provide an initial rinse for washing away the excess composition. The substrate is then cooled to room temperature or to a temperature sufficient to physically secure the chemically-bound polymerized molecules in-situ.

When the film forming substance contains a polymerizable group, the film may be cured, after the excess composition is washed away, by either heating or exposure to a light source, preferably an ultraviolet light source. Polymerization can be initiated at anywhere from 20° C. to 150°. Heat may be applied by blowing hot air on the surface or by passing the articles through an oven. Polymerization may be effected during a time period up to about 30 minutes. In the formulations for the amphiphilic molecules described below, when X in RmSiXn is a halogen, polymerization can be completed in less than one minute and, when a non-halogen, can be substantially completed in up to about 30 minutes.

The amount of time required for film formation and bonding to the surface and/or the surface matrix depends upon the type of substrate, the temperature of the liquid composition and the particular film forming substance being used. However, an advantage of the method of the invention is that the heating of the composition to its liquid state affords improved mobility of the amphiphilic molecules, resulting in a treatment times that are faster than in processes that employ a gel-like composition and typically require treatment times of 15 minutes to one hour. By the method of the invention, the treatment time during which the substrate is immersed in the heated liquid composition is most preferably 30 seconds to 5 minutes.

Because the substrate is immersed in the composition in its liquid state, the coating can reach formerly inaccessible areas in odd-shaped articles. Compared to former methods of applying the composition, the method of the invention, i.e. the immersion of the surface in the heated liquid composition, is more efficient, less wasteful of the composition, and lends itself more favorably to the application of ultra thin films to surfaces on a large scale commercial basis.

The method of the invention also provides a faster and more efficient ultra thin coating of non-porous surfaces, such as glass, ceramic, porcelain, thermoset fiberglass and metal surfaces, that are chemically reactive with the film forming substance but which are not thermoplastic. Thus, the method may be used to quickly and efficiently form ultra thin molecular films on (i) chemically reactive surfaces that are not thermoplastic; (ii) chemically reactive surfaces that are also thermoplastic; (iii) chemically non-reactive surfaces, such as polycarbonate, that are pre-treated with chemically reactive compounds; (iv) thermoplastic chemically reactive substrates that have surfaces pre-treated with chemically unreactive hard coats or anti-reflective metal oxides; (v) thermoplastic substrates that have an inadequate number of chemically reactive moieties on their surfaces, but have available chemically reactive moieties in the surface matrix, such as urethane, acrylic, high index and other plastics.

Compositions used in the method of the invention are particularly useful for providing ultra thin films on glass, ceramic and porcelain cookware, laboratory glassware and eyewear lenses. The films change the surface energy of the surfaces to which they are applied. Films applied in accordance with the method of the invention are relatively permanent in nature and resist all common household solvents and chemicals, as well as food products and cosmetics. The films are hydrophobic, have excellent water beading and anti-stick properties, and provide excellent abrasion and stain resistance. The film is useful for anti-reflective optics, corrosion protection, friction reduction, print priming, moisture barriers, scratch resistance and security marking. As applied by the method of the invention, the films are substantially invisible unless a dye or a polymerizable unit which gives color on polymerization is incorporated in the amphiphilic molecules. The properties imparted to the substrate surface by the film can be varied by selecting different film forming substance.

The films formed in accordance with the method do not interfere with subsequent tinting or ultraviolet dye (e.g. benzophenone or substituted benzophenone) treatment of coated plastic eyewear lenses because the film allows passage of color and UV dyes in high temperature water solutions to the lens without changing the integrity of the film. Lenses pre-treated with anti-reflective metal oxides can also be coated with ultra thin films by the method of the invention. For these heat-sensitive lenses, the heated liquid composition temperature is in the range of 30° C. to 60° C., generally about 45° C.

Amphiphiles that can be used to form film in accordance with the method of the invention include, but are not necessarily limited to, the following:

The polar segment of the amphiphile can be a carboxylic acid or its salts, alcohols, thiols, amides, primary, secondary or tertiary amines, cyanides, nitrates, phosphates, silane derivatives, sulfonates and the like.

The non-polar or apolar component typically consists mainly of alkanes, alkyl ethers, fluorinated alkanes or fluorinated alkyl ethers. These apolar regions may include diacetylene, vinyl-unsaturated, fused linear or branched aromatic moieties. In addition, the apolar region may contain organic dyes with or without metal, such as pthalocyanines, porphyrins and phenol blues.

In an embodiment of the invention, the film forming substance includes silanes and consists essentially of RmSiXn, where R is apolar and is selected from the group having 6 to 30 carbon atoms, and more preferably about 10 to 20 carbon atoms, and consisting of alkyls, alkyl ethers, fluorinated alkyls, fluorinated alkyl ethers, diacetylenes, vinyl unsaturated groups, fused linear aromatic moieties, and branched aromatic moieties. The film forming substance, and particularly the alkyl or fluorinated alkyl group, may include one or more of polymerizable moieties, dyes or dipoles. In the above formula, X is selected from the group consisting essentially of halogens, hydroxy, acetoxy and alkoxy. In the formula, m is 0–3, n is 1–4 and m plus n equals 4. In another arrangement, R may be a substituted silane or siloxane.

In a preferred embodiment of the invention, when metal surfaces are coated by the method of the invention, the film forming substance consists essentially of RX, where R is an apolar group of about 6 to 30 carbon atoms, and more preferably 10 to 20 carbon atoms, and is selected from the group consisting of alkyls, alkyl ethers, fluorinated alkyls, fluorinated alkyl ethers, diacetylenes, vinyl unsaturated groups, and fused linear and branched aromatic moieties, and where X is a thiol, carboxylic acid or its salt, amine, nitrate, cyanide or sulfonate group. The apolar alkyl unit may contain a polymerizable moiety, such as diacetylene, olefin or other cross-linking units. In addition, the apolar region may contain organic dyes with or without metal, such as pthalocyanines, porphyrins and phenol blues. Metal surfaces coatable by the method of the invention are selected from the group consisting of gold, silver, aluminum, titanium, chromium, silicon, platinum, tungsten, copper, nickel, and mixtures of these.

The film forming substance is thoroughly mixed and uniformly dispersed in the carrier to provide a substantially homogeneous composition. The composition preferably has a non-liquid or gel state below 25° C. and a melting point higher than about 30° C., and more preferably higher than 40° C. A preferred melting point range for the composition is 30° C. to 90° C. Compositions with melting points in the lower part of this range are preferred for ease of melting, immersion application and cleaning excess composition from the substrate surface. The composition is typically stored before use at about 20° C. or below in a closed glass or metal container that is impervious to moisture and oxygen.

The carrier used in the composition is non-aqueous and is preferably insoluble in water. The carrier is not noxious or hazardous to persons or the environment. The carrier is preferably one having a substantially neutral pH, although other types of carriers can be used for certain purposes. Most preferably, the carrier is one that meets Food and Drug Administration Regulations 21 CFR 172.880 and 178.3700 for direct and indirect use in food for human consumption. The carrier is preferably one that has an extremely low moisture content and most preferably is one that has been rendered anhydrous. Various grades of petrolatum can be used for the carrier. These petrolatums are of the type used as carriers, emollients, lubricants, base ingredients, binders, protective coatings, plasticizers, waterproofing, release agents, and softeners. The carrier may also be a hydrogenated or partially hydrogenated vegetable or animal oil. Various mixtures of the aforementioned carriers are also possible. Preferably, the carrier is a mineral jelly compounded from white mineral oils, petrolatums and paraffin waxes.

Compositions used in the method of the invention may contain 0.05%–0.5% by weight of a catalyst, such as zinc chloride, aluminum chloride or mineral acids, uniformly mixed in the composition to enhance film formation. The compositions may also contain 0.05%–0.5% by weight of a quencher, such as zinc powder, amines and the like, for neutralizing any acid fumes generated during film formation, by forming a salt. When more than one quencher is used, the total amount of quencher material is not more than about 0.5% by weight of the entire composition, and the same relationship is used for the catalyst.

The composition and carrier preferably have a consistency or firmness at 25° C. as determined by a cone penetration test measured in tenths of a millimeter. Examples of consistency will be given as determined by ASTM designation D937-87 approved Oct. 30, 1987, and published December 1987, the disclosure of which is hereby incorporated herein by reference. In the cone penetration test for consistency, higher numbers mean that the material is softer because the cone penetrates further. The carrier and composition in the gel state preferably have a consistency at 25° C. that is in the range of 35–400, preferably 150–300.

In the method of the invention, the sole material that forms the film in-situ on a substrate surface and within the surface matrix consists essentially of amphiphilic molecules. That is, the sole material in the finished film consists essentially of amphiphilic molecules that form the film forming substance. The film that covers the surface of the substrate (i.e. not including the thickness of film within the surface matrix, if applicable) is essentially a thin layer characterized by its highly uniform thickness of not more than about 0.5 microns.

While the invention has been described herein with reference to certain preferred embodiments, it is to be understood that it is not intended to limit the invention to the specific forms disclosed. On the contrary, it is understood to cover all modifications and alternative forms falling within the spirit and scope of the invention.

We claim:

1. A method for applying an ultra thin film comprising amphiphilic molecules to a substrate surface that is chemically unreactive with or inadequately chemically reactive with said molecules, comprising the steps of:

(a) providing a substrate having a surface that has an inadequate number of or no available surface groups that are chemically reactive with amphiphilic molecules, wherein said substrate surface becomes porous when heated to a temperature in the range of 30° C. to 120° C. and newly exposes a surface matrix comprising moieties that are chemically reactive with the amphiphilic molecules;

(b) providing a composition that comprises a film forming substance dispersed in a carrier that has a gel state at a temperature below 25° C. and a liquid state at a temperature of 30° C. to 120° C., the film forming substance comprising amphiphilic molecules that are chemically reactive with the chemically reactive moieties of the surface matrix and are capable of automatically separating from the composition and of self-assembly and self-polymerization in the surface matrix, the carrier having a consistency in the gel state and the liquid state sufficient to inhibit diffusion of moisture and oxygen into the composition and to hold the molecules in suspension so that agglomeration of the molecules is minimized, wherein the film forming substance consists essentially of $R_mSiX_n$, where R is apolar and is selected from the group of compounds having 6 to 30 carbon atoms consisting essentially of alkyls, alkyl ethers, fluorinated alkyls, fluorinated alkyl ethers, diacetylenes, vinyl unsaturated groups, fused linear aromatic moieties, and branched aromatic moieties, where X is selected from the group consisting essentially of halogens, hydroxy, alkoxy and acetoxy, and where $m=0-3$ and $n=1-4$ and m plus n equals four;

(c) heating the composition to a temperature of 30° C. to 120° C. to form a heated liquid composition;

(d) immersing the substrate in the heated liquid composition for a period of time sufficient to heat the substrate surface to a temperature at which it forms pores in which the chemically reactive moieties within the surface matrix are exposed, wherein during said period of time the amphiphilic molecules automatically separate from the heated liquid compositions impregnate the surface matrix, chemically bond to the exposed chemically reactive moieties within the surface matrix, self-assemble and self-polymerize within the surface matrix, and further self-polymerize to bridge the surface area between the pores to form a substantially continuous thin film on the substrate surface, wherein the film has a substantially uniform thickness not greater than about 0.5 microns;

(e) washing an excess of said composition from the substrate surface and the surface matrix with a heated liquid having a temperature of 30° C. to 80° C.; and (f) cooling the substrate surface to a temperature sufficient to secure the polymerized amphiphilic molecules in-situ.

2. The method of claim 1, wherein the carrier is a mineral jelly compounded from white mineral oils, petrolatums or paraffin waxes.

3. The method of claim 1, wherein the period of time in which the substrate surface is immersed in the heated liquid composition is 5 seconds to 20 minutes.

4. The method of claim 3, wherein the immersion time period is 10 seconds to 10 minutes.

5. The method of claim 4, wherein the immersion time period is 30 seconds to 5 minutes.

6. The method of claim 1, wherein the washing step is accomplished in a sonicator.

7. The method of claim 1, wherein the substrate is selected from the group consisting essentially of urethane, acrylics, high index plastics, and surfaces pre-treated with chemically unreactive compounds.

8. The method of claim 1, wherein the apolar group further comprises a polymerizable moiety.

9. A substrate coated with a thin film according to the method of claim 1.

* * * * *

UNITED STATES PATENT AND TRADEMARK OFFICE
CERTIFICATE OF CORRECTION

PATENT NO. : 5,766,698
DATED      : June 16, 1998
INVENTOR(S): Brij P. Singh; Pramod K. Arora It is certified that error appears in the above-indentified patent and that said Letters Patent is hereby corrected as shown below:

Column 8,

Claim 1, Line 38 should read as follows:

from the heated liquid composition[s], impregnate the

Signed and Sealed this

Eighteenth Day of August, 1998

Attest:

BRUCE LEHMAN

Attesting Officer

Commissioner of Patents and Trademarks